(12) United States Patent
Fukuda

(10) Patent No.: US 6,324,143 B1
(45) Date of Patent: Nov. 27, 2001

(54) MEMORY SYSTEM FOR MULTISIGNAL

(76) Inventor: Hirosi Fukuda, 201-Go, Saniihiru (A Too), 1175-1, Higashi Arai, Tokorozawa-Shi, Saitama-Ken, 359-0034 (JP)

( * ) Notice: Subject to any disclaimer, the term of this patent is extended or adjusted under 35 U.S.C. 154(b) by 0 days.

(21) Appl. No.: 09/402,006

(22) PCT Filed: Mar. 20, 1998

(86) PCT No.: PCT/JP98/01213

§ 371 Date: Sep. 27, 1999

§ 102(e) Date: Sep. 27, 1999

(87) PCT Pub. No.: WO98/43244

PCT Pub. Date: Oct. 1, 1998

(30) Foreign Application Priority Data

Mar. 25, 1997 (JP) .................................................... 9-110005

(51) Int. Cl.[7] ...................................................... G11B 5/76
(52) U.S. Cl. ................................... 369/59.11; 369/59.24; 369/124.01; 369/275.3
(58) Field of Search .................................. 369/59, 47, 48, 369/47.15, 47.16, 59.17, 59.11, 47.5, 47.51, 59.23, 59.24, 59.25, 116, 124.01, 275.3

(56) References Cited

FOREIGN PATENT DOCUMENTS

| | | |
|---|---|---|
| 03-159439 | 9/1991 | (JP) . |
| 05-266482 | * 10/1993 | (JP) . |
| 06-282943 | * 10/1994 | (JP) . |

\* cited by examiner

Primary Examiner—Paul W. Huber
(74) Attorney, Agent, or Firm—Taiyo, Nakajima & Kato

(57) ABSTRACT

Some of various multisignal (a plurality of signals except zero in the conventional binary system ) which are a variety of memories employed as signals instead of a single memory in the binary system are recorded in a medium for multisignal, by moving a recorder for multisignal to a determined position. An extractor is moved to a determined position to extract a part of the multisignal which have been recorded at that position in advance. When any change has to be made to the recorded multisignal, the change is made by the recorder. The multisignal can be used in two or more pairs as well. When processing a signal in the multisignal method in which various signals are used instead of 1 in the conventional binary system, the medium erases, writes, and corrects the signal with a machine which uses multisignal of light, magnetism, etc. that can be clearly discriminated from one another. By this method, the memory size and the speed can be increased and the cost can be lowered, and the memory can be used widely for a personal computer, a word processor, a card, an information equipment, an ATR, a VTR, a D-VTR the Internet, and many other applications.

20 Claims, 23 Drawing Sheets

F I G. 6
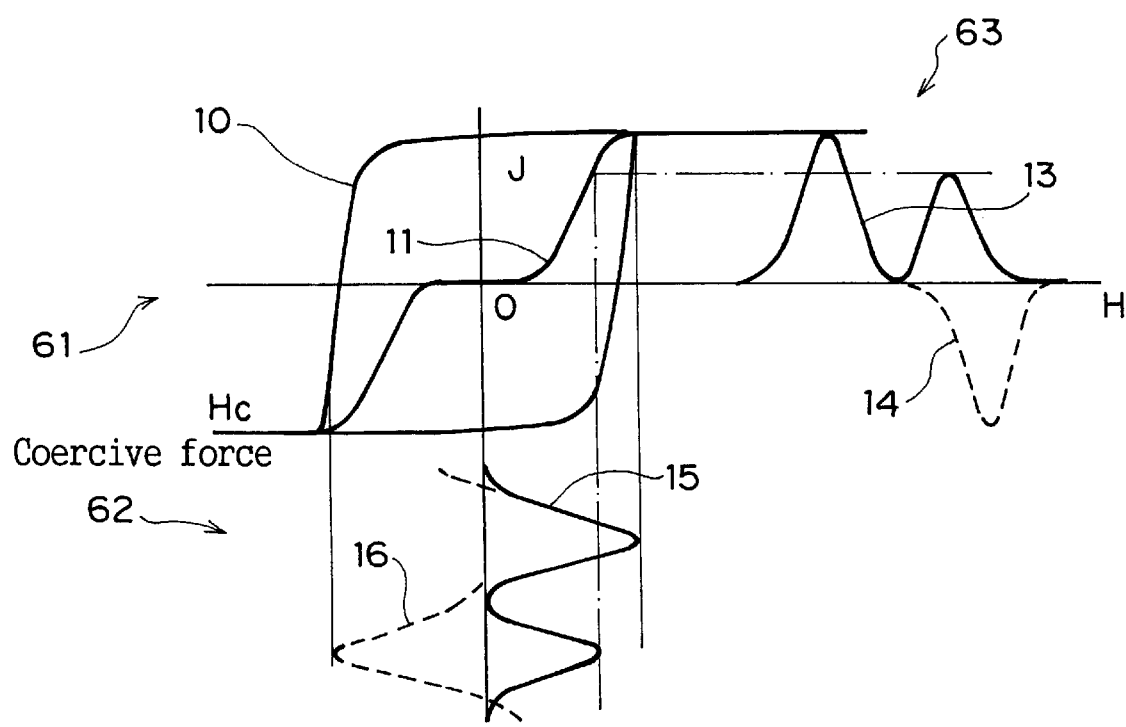

F I G. 1 0
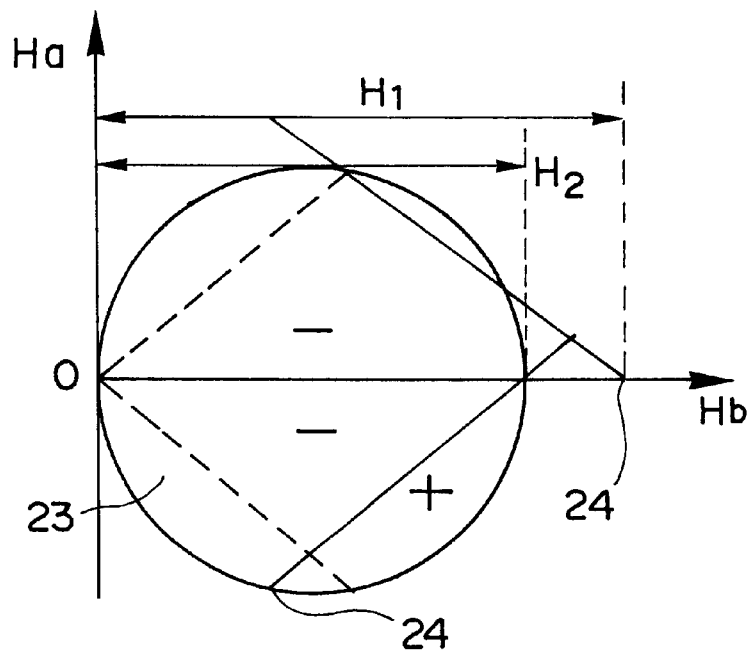
F I G. 1 1
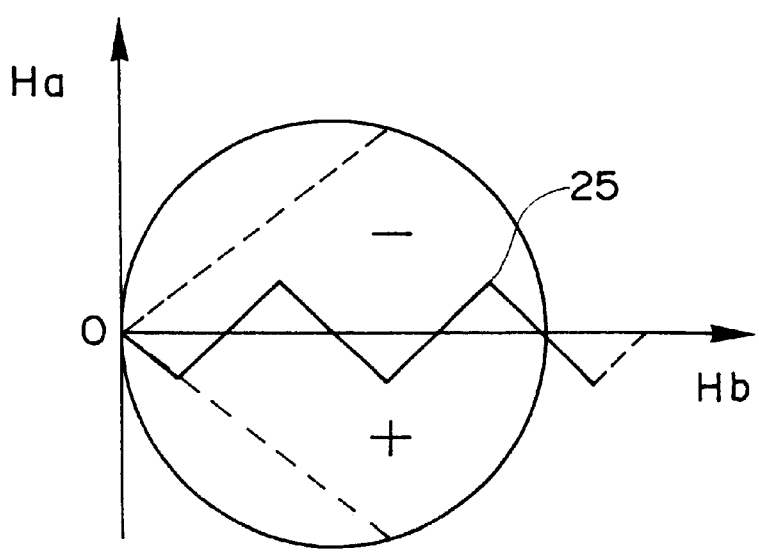

F I G. 3 0
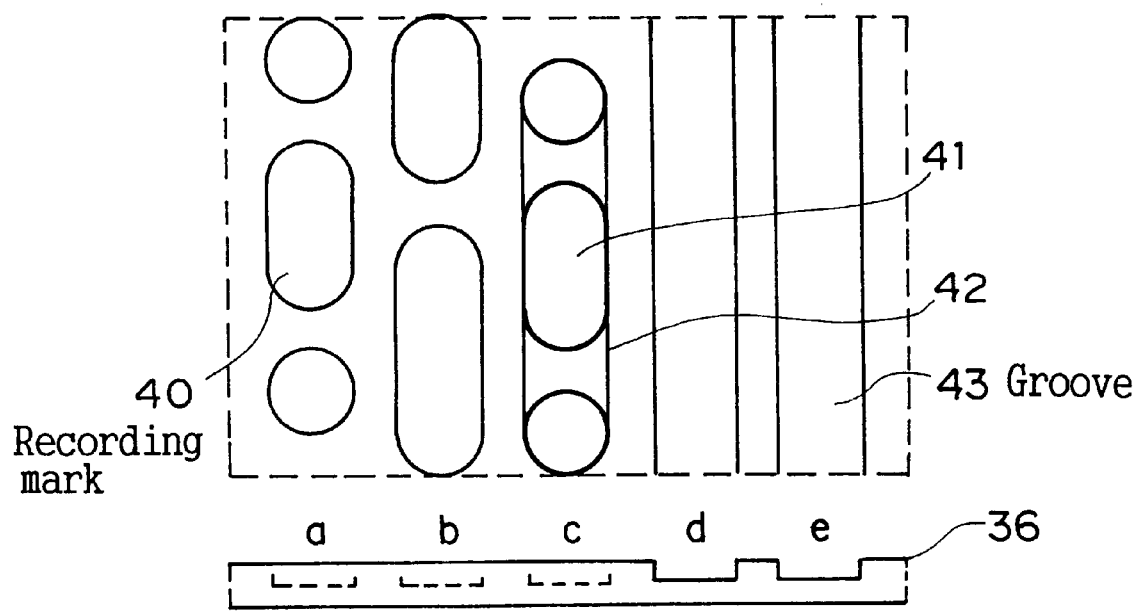

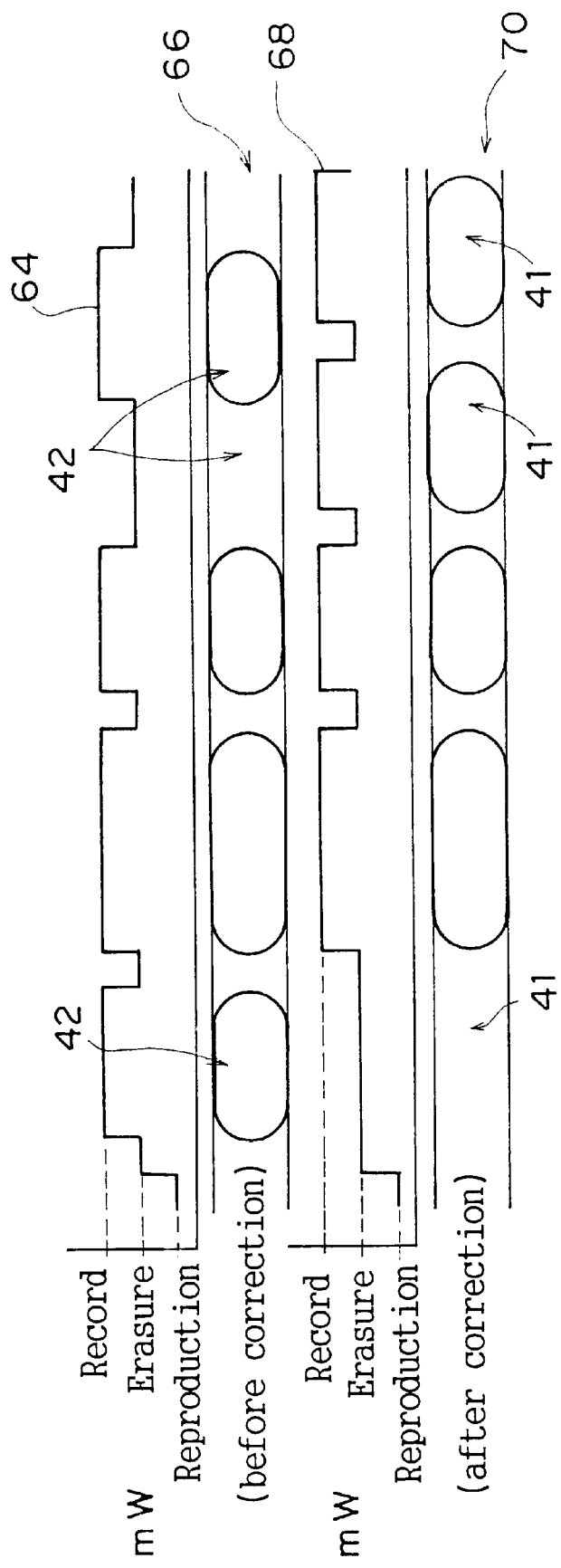

12345ABCDE

CODE-39 TEST

MEMORY SYSTEM FOR MULTISIGNAL

This application is a 371 of PCT/JP98/01213, filed Mar. 20, 1998.

1. Technological Field

Today there is no circuit technology for multisignal in multiple notation. It is true that conventional binary technology and relating microcomputer technology can be applied to multi-notation multisignal too, but the result is far from satisfaction.

As the binary recording system is on the presence/absence of 1(one), even a small quantity of data requires a large recording space. For this reason, it has often happened recently that memory capacity really runs short.

Therefore, the present invention intends to provide a multisignal recording system which enables a larger memory capacity and yet requires a space of almost the same size as required in the conventional system.

This invention relates to a method of producing various kinds of memory points to record digital or analog signals, each point expressing a different meaning according to a certain rule.

This method has had no comparable one up to now, so a particular technology and hardware components to cope with this method, such as a memory unit for recording multisignal, etc. have not yet been developed.

2. Background Technology

At present, recording media like magnetic tapes and disks, optical disks, etc. are all prepared to record signals with 0's and 1's in the binary system.

Therefore, to deal with such a large amount of data as the multisignal system is expected to treat, the binary recording system needs a very large amount of memory medium, as the recording operation is repeated over and over again. But the size of a recording medium(tape, disk, etc.) has its own limit, and so does its recording space.

For example, to put into practice the code transmission system which I have applied for its patent in 1989, or any other multisignal system in future, there can be no other choice for the time being than spending plenty of binary memories(magnetic tapes, floppy disks, or optical disks, etc.), using today's microcomputers or personal computers.

Though there is a growing need today to record a large quantity of data, recording capacity of media is getting relatively smaller. Sometimes recording is really impossible because of the shortage of the memory capacity.

For the time being, there is no other way of recording than using the presence/absence of something according to the binary system: using that of a hole in case of an old type of memory, a punch tape; using that of a single kind of magnetic point or optical dot in case of conventional memories(i.e. a magnetic tape, a magnetic floppy disk, an optical disk, etc.).

Therefore, the conventional recording system can hardly record a large amount of various complicated phenomena of today. Or if can, a very large quantity of memories are needed. This makes a big problem.

The recording cost has a great influence on marketability of this method. While the binary system appends a large quantity of magnetic tapes, disks, cards, etc., to record signals, the multisignal recording system needs relatively small quantity of them and their materials. So when this method is employed, the recording cost will be reduced greatly.

In the determination of the writing/reading cost, recording density plays an important role. As the multisignal method of this invention has high recording density by nature, it is no wonder that the cost is low.

Computer systems are expected to operate at high speed. This method can increase the speed because of multisignal.

This method makes it possible to record signals in diverse tracks, i.e. multichannels, if a high recording speed is not necessarily desired.

In this way, this invention provides low cost, high density, high speed, and multichannels in data recording, as a result of using various magnetic or optical factors, making it possible to record, recognize, and read them out, and thus taking the place of the conventional recording method based on only the presence/absence of a hole, a magnetic point, or an optical dot, etc. It is also an aim of this invention to provide a plain method of memory correction.

DISCLOSURE OF INVENTION

Factors to be used as recording signals are strength, size, shape, etc. of magnetism in case of magnetic tapes and disks, and size, shape, etc. of an optical mark in case of optical disks. By using such factors as signals, it has become possible for one memory point to represent a plural value. In this invention, one of the signals representing not only 1 but also any particular plural numeral is produced at a memory point instead of 1 in the binary system by a recorder, and digital or analog values thus recorded are read out by an extractor.

It is also possible to record and extract a plurality of blocks, each composed of such memory points.

In other words, this invention intends to solve the aforesaid problems by choosing some signals of various factors and giving a plural meaning to each of the signals prior to the recording, and making a memory point in which one of the signals is recorded a recording unit.

In order to make a single memory point possible to record a plural value, each of them having a special meaning at a particular recording, it is necessary to digitize or analogize factors of magnetism or laser, like its intensity, shape, etc., so that each of the factors can be recorded and extracted.

The low recording cost means high marketability. This invention can be applied to conventional magnetic tapes, disks, and cards as well which are now widely used and will be used more widely in future.

The recording density in this invention is very high by its nature, as a single memory point can stand for a plural meaning.

As for the processing speed, this invention doesn't need to move the head so frequently as the binary system does, for this method uses multisignal and each of them out, and correction can be achieved easily.

It is also possible in this invention to combine two or more memory points together, and to record or extract them at one time. That enables this method to record signals in diverse tracks.

The present invention is the method to achieve the above-mentioned purposes satisfactorily.

BRIEF EXPLANATION OF DRAWINGS

FIG. 6, the relationship between hysteresis characteristic and each space. FIG. 10, the way to discriminate output lengths. FIG. 11, bar codes at present.

BEST EMBODIMENT OF INVENTION

Figure 1:
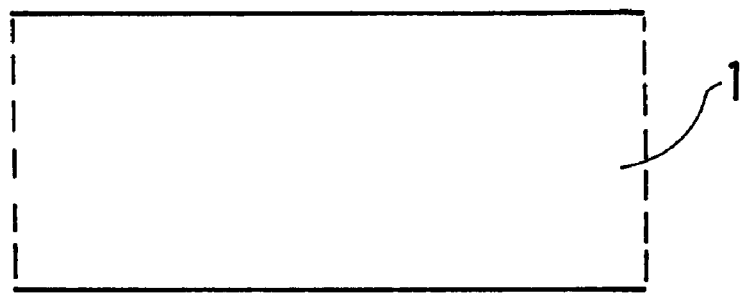
FIG. 1 shows the structure of a magnetic tape and a magnetic floppy disk for multisignal.

This is an explanation of the best embodiment of the invention with actual examples, referring to the drawings.

FIG. 1 shows an example of the structure of a magnetic film and a magnetic floppy disk for multisignal. In these media, different kinds of magnetic points can be recorded according to intensity of magnetism.

(a) illustrates the structure of videotape as a plaster-type of flexible medium. (1) is the plan of the tape and (2) is its vertical section.

To a polyester base film 3, an undercoat 2 is given. Then a magnetic layer 1 is formed by plastering such a magnetic substance as $\gamma$-$Fe_2O_3$, $CrO_2$ or Co-$\gamma$-$Fe_2O_3$ with its binder onto the undercoat. On the reverse side, a beck coat 4 made of conductive carbon is applied for the purpose of protection.

(b) shows the structure of a magnetic floppy disk for computers as a thin-film type of hard medium. (1) is the plan of the disk and (2) is its vertical section.

To a base disk 9 of AlMg alloy, a Ni—P undercoat 8 is applied by no-electrolytic plating. On the under coat, a magnetic layer 7 of Co—Ni—P or Co—Ni is formed by plating or spattering. On the surface of the layer, a film 6 of C or $SiO_2$ is applied for the purpose of protection and smoothing.

Figure 2:
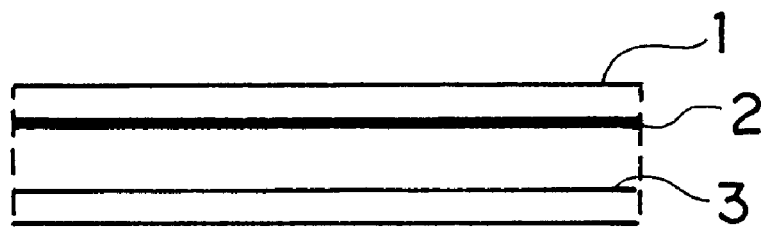
FIG. 2, the structure of the magnetic head of this invention.

In order to record signals in a medium and reproduce them, a magnetic head is needed. FIG. 2 is the diagram of the structure of a magnetic head. On recording, a recording current is run through a coil. Then a magnetic flux is generated there, runs through a gap, permeates space, and makes a magnetic point on the medium.

On reproduction, leakage flux of a magnetic point on the medium is caught across space by the gap and runs through the core. Then an electric current is generated at the coil, producing reproduction voltage.

Figure 3:
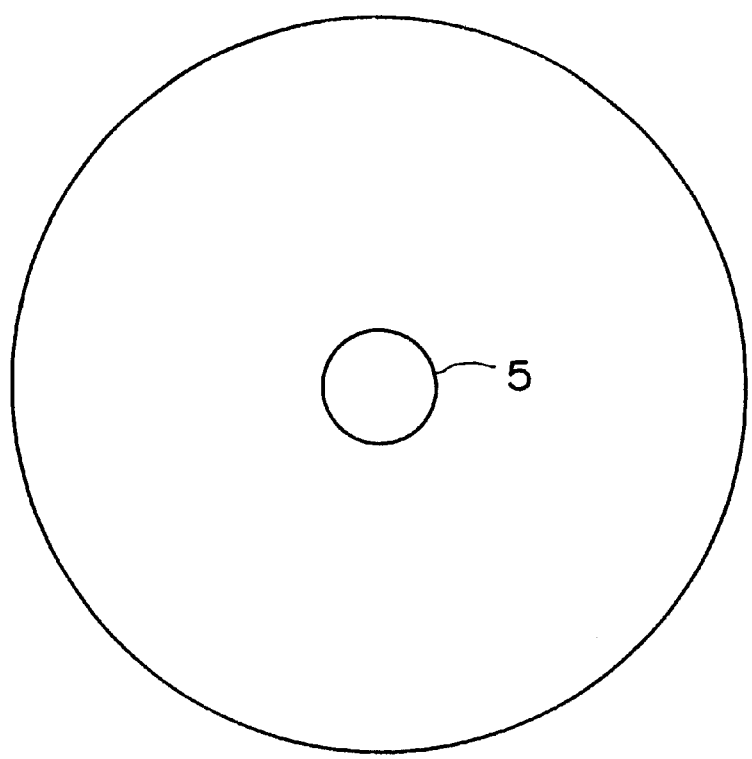
FIG. 3, the characteristics of magnetic record and reproduction.

FIG. 3 illustrates the characteristics of magnetic record and reproduction.

(a) shows that magnetic record basically has such a non-linear characteristic as the amplification characteristic of a semiconductor. (1) is a hysteresis characteristic (a magnetization curve or a J-H curve). (2) shows a magnetic field waveform of an input signal: a magnetic field waveform generated by a direct current is drawn in solid line 15, and one generated by an alternative current - - - in dotted line 16. In this example, the heights of waveform by a direct current have been corresponded to, and reflected by, a recording magnetization characteristic 11 which is the initial magnetization curve of the hysteresis 10. (3) shows a leakage flux waveform: solid line 13 expresses one by a direct current, and dotted line 14 - - - one by an alternative current.

The heights of the magnetic field waveform (2) of the input signal corresponds to the heights of the leakage flux waveform (3). Thus when a recording current with various heights according to input signals goes through the coil, various intensity of magnetization is generated in the medium. On the contrary, the intensity of a leakage flux in the medium makes the various heights of a reproduction voltage. This is the very principle which gives a characteristic to this invention.

(b) expresses the relationship between the magnetization of the medium and the reproduction output. A waveform of leakage flux 17 in (1) magnetized in the medium produces reproduction voltage in comparison with time differential value, and results in a waveform 18 in (2). This distorted waveform can be trimmed by a shaping circuit.

Figure 4:
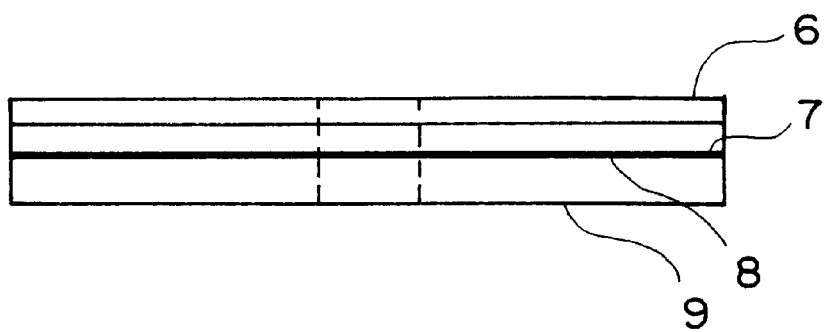
FIG. 4, states of space along the initial magnetization curve, negative residual flux density by a direct current, and erased state by an alternative current.

FIG. 4 illustrates various states of magnetic domains in circles along the initial magnetization curve 19, expressed in the situations of magnetic walls and of magnetization directions(spins) along with the movement of the transition axis of magnetization.

In (a), magnetic domain a is in the erased state, with its transition axis in the center. This is the case when an external magnetic field H is not put on a ferromagnetic bulk material. When a weak external magnetic field is put on this erased state, the transition axis moves, and the domain turns into the state b. A stronger external field turns the domain into the state c which looks fully magnetized as a whole. And a much stronger external field brings the domain to the state d, with all the magnetization directions (spins) 20 in magnetic walls 21 turned to the same direction as that of the external field.

In (b), (1) illustrates the state of a domain in which magnetization inversion lines 24 are expanded from the inverse saturated magnetic field toward the P-particle distribution range 23. (2) is the erased state produced by an alternative current. On both sides of a zigzag magnetization inversion line, the numbers of positive and negative magnetization particles have settled down almost equal, and the erased state is achieved. The higher the frequency grows, the finer the zigzag becomes.

Figure 5:
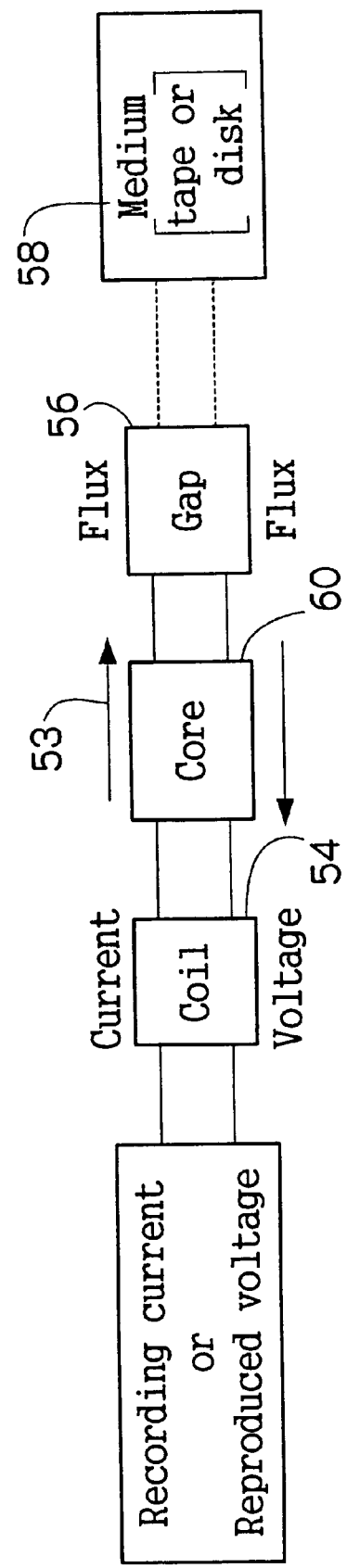
FIG. 5, density distribution of P-particles, and the relationship between the density and hysteresis characteristic.

In FIG. 5, (1) illustrates the density distribution of Pparticle, particle, $\rho$ (a,b)DaDb, in microsquares Da and Db around a point P(a,b). (2) shows the relationship between $\rho$ (a,b)DaDb, i.e. the density distribution in (1), and the hysteresis characteristic. The relationship can be expressed by the following formula:

$$\rho(a,b)DaDb=J(H_1H_3)-J(H_1H_4)-J(H_2H_3)+J(H_2H_4) \quad \text{[Formula 1]}$$

FIG. 6 explains the relationship between the hysteresis characteristic and the magnetic domain.

(a) shows the erased state, which corresponds to the point a in (g), as the initial condition of the hysteresis characteristic.

(b) is the state corresponding to the point b in (g), where an external magnetic field Hx is put on the medium in the positive direction.

(c) corresponds to the point c in (g), where a much stronger external magnetism Hs has shifted the magnetization inversion line to the right, bringing the domain to the state of positive saturation.

(d) is the state of positive residual magnetization, which corresponds to the point d in (g). As the external magnetism decreases its intensity to zero, the point c in (g) shifts to d.

(e) corresponds to the point e in (g). An external magnetic field Hc has worked in the negative direction until the point d in (g) shifts to e, where coercive force is generated.

The state (f), corresponding to the point f in (g), is that of negative saturation brought about by a much stronger negative magnetism Hs.

Figure 7:
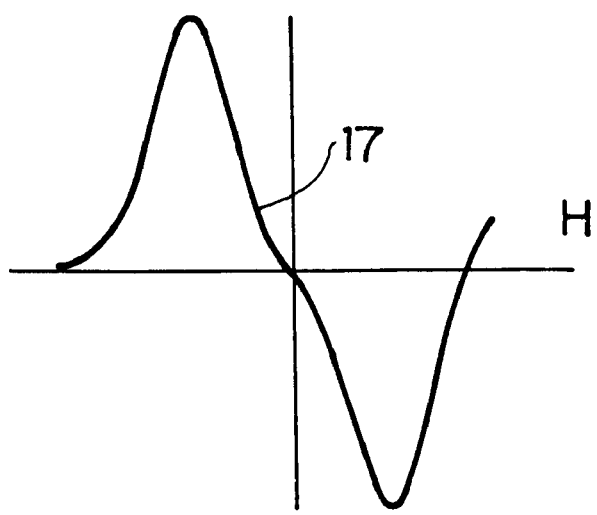
FIG. 7, the relationship between recording current and reproduced output with the wave length as a parameter.

FIG. 7 shows that when recording current i and its wave length $\lambda$ vary according to input signals, reproduced output too changes variously. This fact is important.

From all the foregoing, it is obviously possible to vary the intensity of recording magnetic field in space. And from FIG. 7, it is also clear that the recording magnetic field varies its intensity in accordance with recording current and its wave length, and so does the reproduced output generated by the leakage flux of the magnetic field.

The magnetization of one particle in a single domain in a medium is achieved only by the rotation of the magnetization direction. In such a case, much energy is needed to change the direction against crystal magnetic anisotropy. This fact gives a strong coercing force to the domain.

Figure 8:
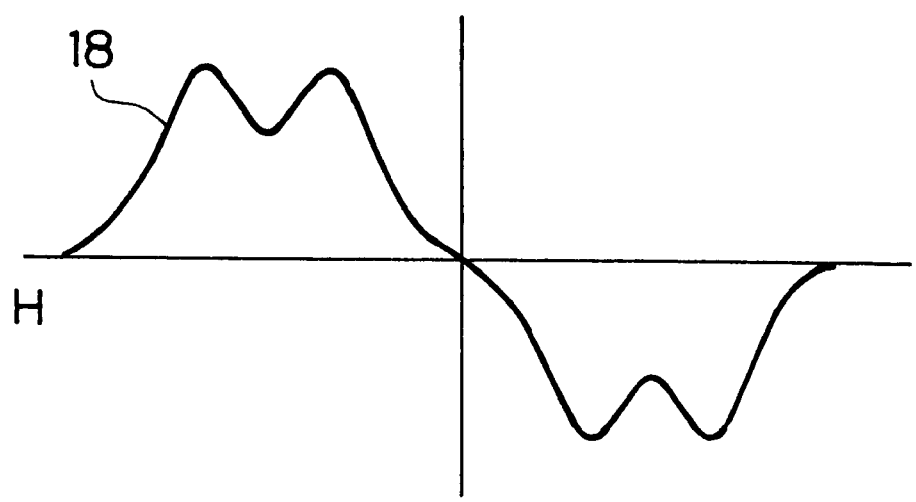
FIG. 8, data signals and reproduced output recognized by levels.

FIG. 8 shows a variety of information waveforms by a recording current, and their reproduced counterparts discriminated from one another.

(a) illustrates examples of information signals to be recorded. These signals are input into the magnetic head, with a signal of the highest level at their front, in order to adjust the signals to level sensing.

(b) shows the reproduced counterparts of the information signals in (a). After an AGC or limiter is adjusted to the highest level, sensing levels discriminate the waveforms of the output signals correctly.

Figure 9:
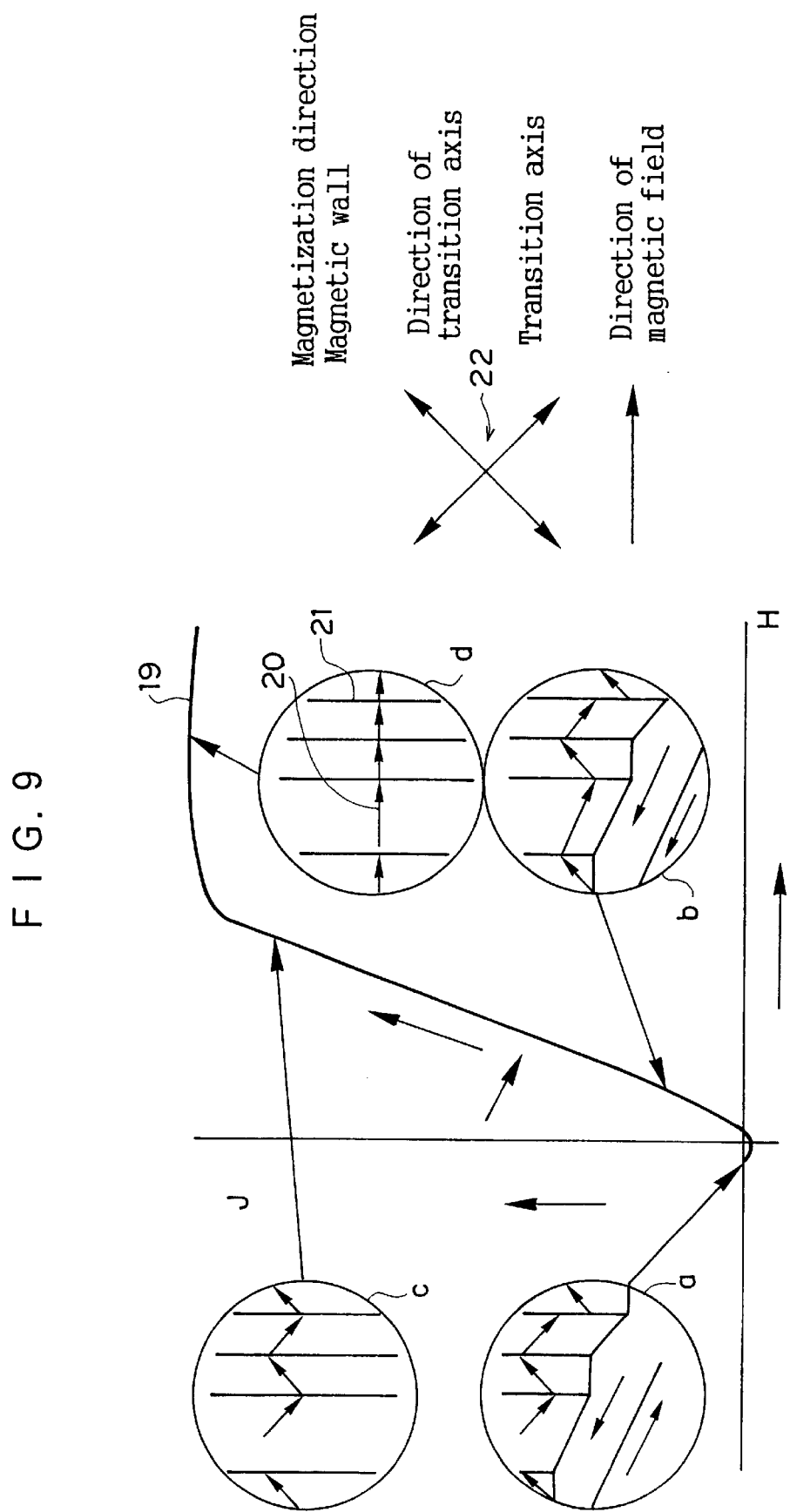
FIG. 9, the structure of an optical disk, its operation method, marks, signals and their treatment, and the principle of the treatment.

FIG. 9 illustrates the recording system with an optical disk for multisignal in which shape, length, etc., of optical marks are used as signals, and in which the marks can be written-in, read-out, erased, and corrected.

(a) is the vertical section of a both-sided optical disk used for the experiment of this invention. 34 is a base plate of polycarbonate, 33 is a dielectric layer of ZnS—SiO$_2$, 32 is a recording layer of GeTe—Sb$_2$Te$_3$—Sb, 31 is another dielectric layer of ZnS—SiO$_2$, 30 is a reflecting layer of Al, and 29 is an adhesive layer to bind the both sides.

(b) shows how to drive the optical disk for multisignal. To drive the disk 36, it is placed onto the shaft of a motor 38 which at the same time serves as the disk drive shaft 35. To write-in and read-out signals, laser 37 is emitted by an optical head 39. At reading out, the head detects the change of reflection rate of the emitted laser reflected by the medium.

(c) illustrates recording conditions in the optical disk for multisignal 36.

Some examples of recording marks are shown in the rows a and b. The row c shows that an old mark 42 has been erased and a new mark 41 is written-in.

The optical disk is 2.5 mm thick, 120 mm in diameter. Wave length of the laser is about 800 nm, rotary velocity of the motor is 1800 rpm, and driving velocity is 30 rpm. Recording power is about 20 mW, linear velocity is 10 m/s, and length of a mark is 1 $\mu$m. The grooves d and e are 100 nm deep, 1.6 $\mu$m wide, and 0.8 $\mu$m apart from each other.

(d) shows the relationship between laser power and patterns produced by the head 39. When laser power (mW) for reproduction, erasure, and record is applied to the disk as Drawing (1), patterns are produced and recorded as Drawing (2). In order to correct these patterns, laser power (mW) for correction is applied as Drawing (3). Then the patterns are corrected as Drawing (4).

(e) expresses conditions of GeTe—Sb$_2$Te$_3$—Sb at recording and erasing. GeTe—Sb$_2$Te$_3$—Sb in the recording layer of the disk is amorphized or crystalized by the power of a laser pulse: the recording layer is amorphized by a laser pulse of 80 ns in width and 20 mW in power, and it is crystalized by a laser pulse with the same width and 10 mW in power. (1) shows power levels of the laser power: 44 is the level of recording power, while 45 is that of erasing power. (2) are states of patterns (erased ring 46 and recorded ring 47). As shown in (3), under impressed temperature the crystalization point 49 makes a larger pattern, while the melting point 48 makes a smaller one.

FIG. 10 illustrates examples of reproduced signals as pulses. An integrating circuit changes length of optical marks into level pulses, and sensing levels 5~8 sense and discriminate the reproduced pulses 50.

FIG. 11 are examples of today's bar codes: 51 is of high density, 52 is of low density. With four kinds of thickness of bars and various breadth between them, bar codes express many things. These bar codes are shown here to make comparison with a recording means of this invention.

Figure 12:
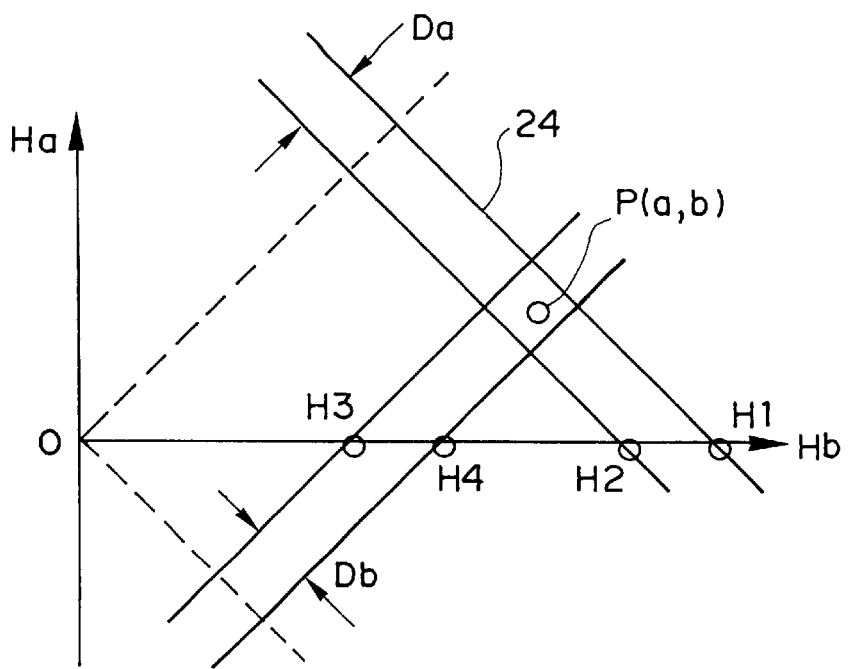
FIG. 12 shows the discrimination of bar codes by thickness of a bar, breadth between bars, and length of a bar.

FIG. 12 is an example of recording means as one of applications of the present invention. (1) are examples of thickness of bars 53, and (2) are those of breadth between them. These means are the same as today's bar codes. The quantity of expressions by them is now getting short.

So, in (3), this invention uses length of bars as codes, sensed by levels 12~15. 56 are positive codes and 55 are positive-negative. Combining this means with today's bar code technique, increasingly much quantity of expressions can be produced.

Industrial Applicability

As mentioned above, the present invention yields very large quantity of record, easy operation of systems, reduction of bit cost to less than half.

The experiment of this invention tells you that a medium of this invention after recording can be stored long, and has a good weather resistance. Therefore, information recorded in the medium can be taken out accurately, and the medium can be used over and over again without being damaged. This invention makes it possible to record much information in high density, and to write-in and read-out in high speed. In this invention, input information can be recorded instantly and reproduced soon after the recording. You can immediately seek out and read out information you want. Because of these advantages, this invention is very effective.

This invention has a wide range of industrial application which includes an ATR, a VTR, a DAT, a D-VTR, a magnetic disk apparatus for computers, a personal computer, a word processor, goods dealing, a card, the Internet, etc.

What is claimed is:

1. A method of increasing digital data storage capacity for recording media, wherein the recording media includes a plurality of recording locations, the method comprising the steps of:

(a) defining a number of selectively variable magnetization intensity levels for each data recording location on the recording media, the defined selectively variable magnetization intensity levels corresponding to at least an erased state, a partially magnetized state, a fully magnetized state and a state including magnetization spins all aligned the same;

(b) selecting a notation system comprising digits that include a number of different possible values for each digit, with the total number of possible values for each digit corresponding to the number of selectively variable magnetization intensity levels defined for each data recording location;

(c) uniquely associating each possible value of the digits to a different selectively magnetization intensity level defined for each recording location; and (d) recording the data on the recording media in a format in accordance with the notation system, by adjusting the magnetization intensity level of data recording locations where a digit of the data is recorded on the recording media.

2. The method of claim 1, wherein magnetization intensity of a recording location where a digit of data is recorded, corresponds in level to the value of the digit.

3. A method of increasing digital data storage capacity for recording media, wherein the recording media is substantially planar and includes a plurality of recording locations, the method comprising the steps of:

(a) defining at least three optical patterns for each data recording location on the recording media for selective formation at the data recording locations, the optical patterns being distinguishable from one another based on at least one of size and shape extending substantially along the plane of the recording media;

(b) selecting a notation system comprising digits that include a number of different values for each digit, with the total number of possible values for each digit corresponding to the number of optical patterns defined for each data recording location;

(c) uniquely associating each possible value of the digits to a different pattern defined for each recording location; and (d) recording the data on the recording media in a format in accordance with the notation system, by forming optical patterns at recording locations where a digit of the data is recorded on the recording media.

4. The method of claim 3, wherein the recording media comprises a material crystallizable, and the step of recording data on the recording media includes subjecting the recording media at recording locations for recording data, to a laser beam and selectively crystallizing the recording media at recording locations.

5. The method of claim 4, wherein the material comprises GcTc—$Sb_2Te_3$—Sb.

6. The method of claim 5, further comprising the step of modifying data recorded on the recording media, by altering the optical patterns of recording locations where data has previously been recorded during the step of recording the data on the recording media.

7. The method of claim 4, further comprising the step of modifying data recorded on the recording media, by altering the optical patterns of recording locations where data has previously been recorded during the step of recording the data on the recording media.

8. The method of claim 7, wherein the recording media comprises a material amorphizable and crystallizable, and the step of recording data on the recording media includes subjecting the recording media at recording locations for recording data, to a laser beam at a first power level and crystallizing the recording media at recording locations; and the step of modifying data includes subjecting the recording media at recording locations to a laser beam at a second power level and amorphizing the recording media thereat when data is modified at that recording location.

9. The method of claim 8, wherein the material comprises GeTe—$Sb_2Te_3$—Sb.

10. The method of claim 3, further comprising the step of modifying data recorded on the recording media, by altering the optical patterns of recording locations where data has previously been recorded during the step of recording the data on the recording media.

11. A method of increasing digital data storage capacity for recording media, wherein data is recorded on the media as bar card elements, the method comprising the steps of:

(a) defining at least three attributes for each bar code element;

(b) selecting a notation system comprising digits that include at least three different possible values for each digit for recordation of data on the recording media;

(c) uniquely associating each possible value of the digits to a different attribute defined for each bar code element; and (d) recording the data on the recording media in a format in accordance with the notation system, by adjusting the defined attributes of the bar code elements where a digit of the data is recorded on the recording media.

12. The method of claim 11, wherein the at least three attributes correspond to length and thickness of bar code elements, and spacing between bar code elements.

13. An electronically readable computer product comprising:

(a) a recording media including a material amorphizable at one temperature and crystallizable at another temperature, the media further including a plurality of recording locations, and each recording location comprising one of at least three optically distinguishable patterns; and (b) signal trains recorded on the recording media, with the signal trains expressing data according to a notation system comprising digits including at least three possible values per digit and each value uniquely associated with one of the at least three optically distinguishable patterns, and recording locations where digits of the signals trains are recorded thereat corresponding to the value of the digit recorded at that recording location, with the material at recording locations where a nullity is recorded being substantially amorphized, and recording locations where a digit other than a nullity is recorded, crystallized.

14. The electronically readable computer product of claim 13, wherein the material comprises GeTc—$Sb_2Te_3$—Sb.

15. The electronically readable computer product of claim 13, wherein the recording media is substantially planar and each pattern represents the value of a digit recorded at the recording location corresponding to the optical pattern, based on at least one of shape and length, extending substantially along the plane of the media, of the optical pattern.

16. A system for storing data in electronically readable format, the system comprising:

(a) substantially planar recording media including a plurality of data recording locations, wherein each data recording location is defined with one of at least three optical patterns, the optical patterns being distinguishable from one another based on at least one of size and shape extending substantially along the plane of the recording media; and (b) a recorder operable for expressing data in signal trains according to a notation system comprising digits that include at least three possible values per digit for recordation of data on the recording media by uniquely associating each possible value of the digits with a different optical pattern at the recording locations than the other values of the digits, and recording the signal trains on the recording media by creating optical patterns at recording locations where digits of the signal trains are recorded on the recording media according to the value of the digit recorded at that location.

17. The system of claim 16, wherein the material comprises GeTe—$Sb_2Te_3$—Sb.

18. The system of claim 16, wherein the recording media comprises a material amorphizable and crystallizable, and the recorder includes a laser which selectively subjects the recording media at recording locations for recording data, to a laser beam at a first power level and crystallizing the recording media thereat when data is recorded at that recording location, and subjects the recording media at recording locations to a laser beam at a second power level and amorphizing the recording media thereat when erasing data at that recording location.

19. The system of claim 18, wherein the material comprises GeTe—$Sb_2Te_3$—Sb.

20. The system of claim 16, further comprising means for erasing optical patterns previously created at recording locations with the recorder.

* * * * *

UNITED STATES PATENT AND TRADEMARK OFFICE
CERTIFICATE OF CORRECTION

PATENT NO. : 6,324,143 B1
DATED : November 27, 2001
INVENTOR(S) : Hirosi Fukuda

It is certified that error appears in the above-identified patent and that said Letters Patent is hereby corrected as shown below:

Column 1-10, should be deleted to appear as per attached columns 1-10.

Signed and Sealed this

Seventeenth Day of August, 2004

JON W. DUDAS
*Acting Director of the United States Patent and Trademark Office*

MEMORY SYSTEM FOR MULTI-VALUED DATA ELEMENTS

BACKGROUND OF THE INVENTION

Today there is an absence of circuit technology for use with multi-valued data elements. It is true that conventional binary technology and relating microcomputer technology can also be applied to multi-valued data, but the result is far from satisfactory.

As the binary recording system is based on the presence/absence of 1 (one), recording even a small quantity of data requires substantial recording space. For this reason, memory capacity is often found to be inadequate.

In contrast, the present invention provides a multi-valued recording system which enables a larger memory capacity and yet requires recording space of almost the same size as required by a conventional system.

This invention relates to a method of producing various kinds of memory points to record digital or analog signals, with each point expressing a different meaning according to a certain rule.

There has been no comparable method up to now, so technology and hardware components to carry out this method, such as a memory unit for recording multi-valued date elements and etc., have not yet been developed.

At present, recording media such as magnetic tapes and disks, optical disks, and etc. have been prepared to record signals with 0's and 1's according to the binary system.

Therefore, to deal with such a large amount of data as the multi-valued element system is expected to treat, the binary recording system needs a very large amount of memory medium, as the recording operation is repeated over and over again. However, the size of a recording medium (tape, disk, and etc.) has its own limit, and consequently so does its recording space.

For example, to put into practice code transmission systems, or any other multi-valued system in the future, there can be no other choice for the time being than using large quantities of binary memory storage media (magnetic tapes, floppy disks, optical disks, and etc.), using today's microcomputers or personal computers.

Though there is a growing need today to record large quantities of data, recording capacity of media is failing to grow proportionally. In fact, sometimes data recording becomes impossible due to a shortage of memory capacity.

For the time being, no alternative exists to recording data using the presence/absence of some quantity according to the binary system: using a hole in the case of punch tape; using a single type of magnetic point or optical dot in case of conventional memories, i.e., magnetic tape, magnetic floppy disks, optical disks, and etc. The binary recording system is therefore inherently limited and problematic.

The reduced data recording costs realized by the method of the current invention has a great influence on its marketability. While the binary system requires large quantities of magnetic tapes, disks, cards, and etc., to record signals, the multi-valued data element recording system needs relatively small quantities of recording media and their materials. So when a method according to the current invention is employed, recording costs will be reduced greatly.

In the determination of the writing/reading cost, recording density plays an important role. As the multi-valued data element recording method of this invention has high recording density by nature, cost is inherently low.

Computer systems are expected to operate at high speed. The method according to the current invention can increase the speed because of multi-valued data writing/reading.

Further, this method makes it possible to record signals in diverse tracks, i.e., multichannels, if a high recording speed is not necessarily desired.

In this way, this invention provides low cost, high density, high speed, and multichannels in data recording, as a result of using various magnetic or optical factors, making it possible to record, recognize, and read-out, and thus taking the place of the conventional recording method based on only the presence/absence of a hole, a magnetic point, or an optical dot, and etc. It is also an aim of this invention to provide a simple method of memory correction.

SUMMARY OF THE INVENTION

Quantities to record multi-valued data elements include strength, size, shape, and etc. of magnetism in the case of magnetic tapes and disks, and size, shape, and etc., of optical marks in the case of optical disks. By using such quantities to encode data, it has become possible for one memory point to store multiple values. In this invention, the multi-valued data elements represent data not only as 0 or 1 as in the binary system, but as any particular value produced at a memory point by a recorder. Digital or analog values recorded according to this process are subsequently read-out by an extractor.

It is also possible to record and extract a plurality of blocks, each composed of such memory points. In other words, this invention intends to resolve the limitations of the binary system by using signals of variable parameters and assigning plural meanings to the signals based on the variable parameters, and recording one of the signals at a memory point as a recording unit.

In order to make a single memory point suitable for recording multi-valued data elements, where each of them has a special meaning in a particular recording, it is necessary to digitize or analogize magnetic or optical factors, such as intensity, shape, and etc., so that data according to each of the factors can be recorded and extracted.

The low recording cost enabled by the multi-valued data recording method of the present invention yields high marketability for the method. This invention can be applied to conventional magnetic tapes, disks, and cards as well, all of which are currently widely used and which will be used even more widely in the future.

The recording density in this invention is very high by its nature, as a single memory point can represent multi-valued data. Processing speed is also enhanced according to the method of this invention because the reading/writing head does not need to move as frequently as with the binary system. Less frequent movements are required because this method uses multi-valued data elements.

A method is also possible according to this invention to combine two or more memory points together, and to record or extract them at one time. That enables this method to record signals in diverse tracks.

BRIEF EXPLANATION OF DRAWINGS

Figure 13:
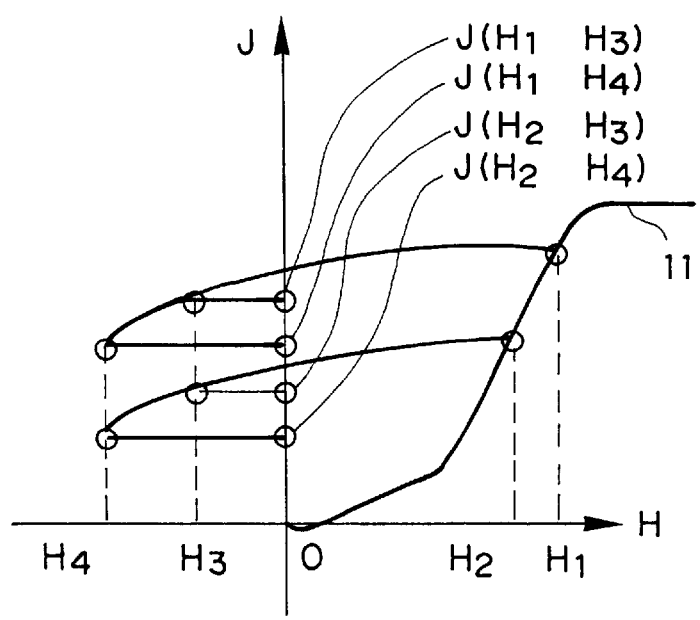
Figure 21:
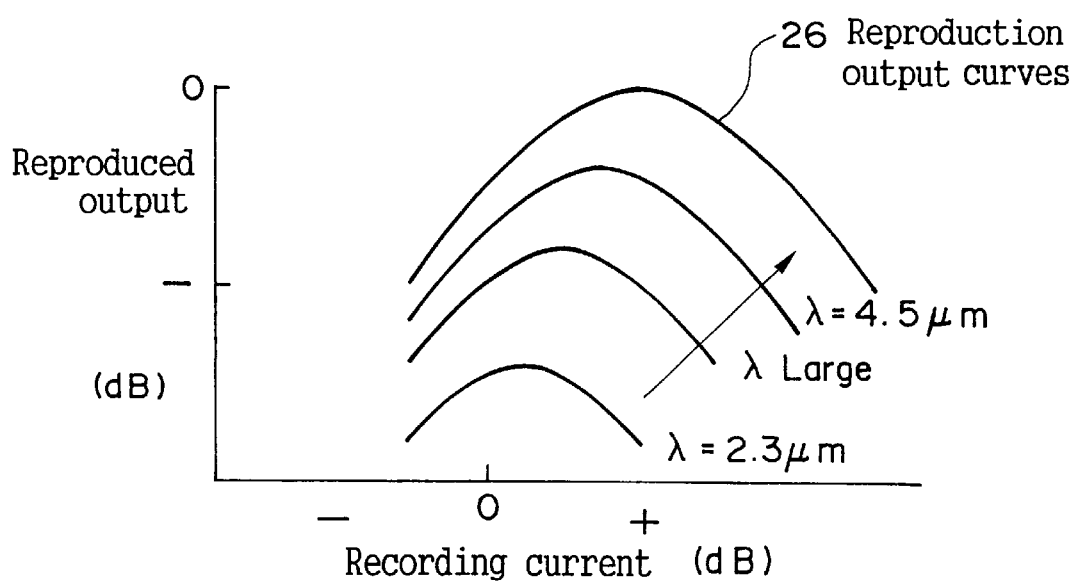
Figure 35:
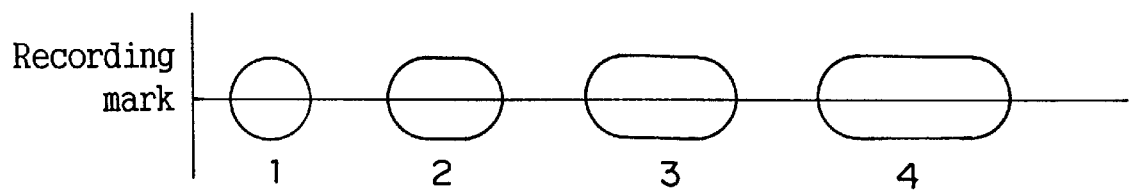
Figure 36:
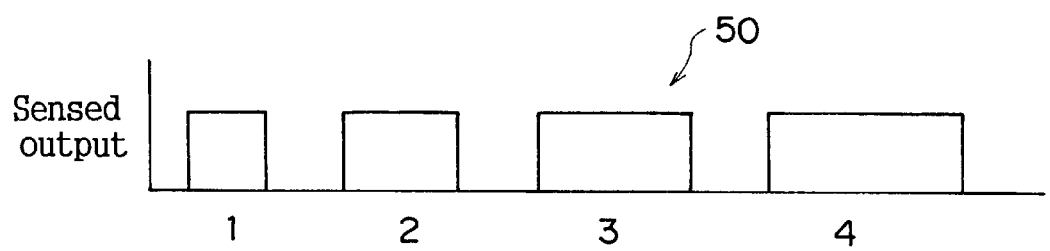
Figure 37:
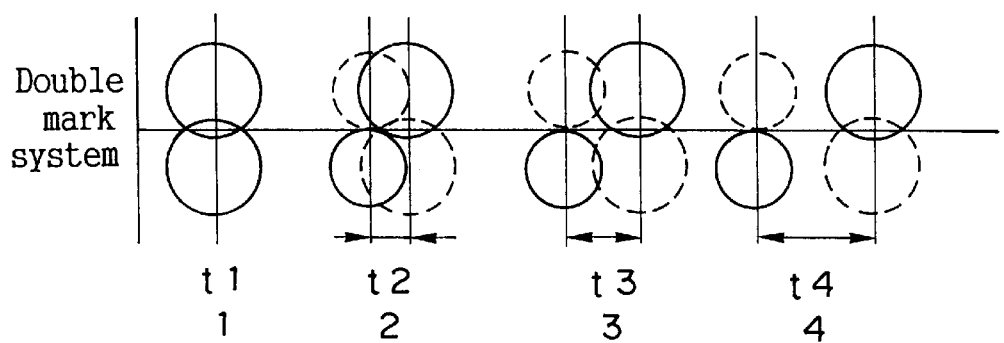
Figure 38:
Figure 39:

FIGS. 1–4 show the structure of a magnetic tape and a magnetic floppy disk suitable for storing multi-valued data elements;

FIG. 5 shows the structure of a magnetic head for recording multi-valued data elements by a method in accordance with this invention;

FIGS. 6–8 show waveform characteristics of magnetic recording and reproduction;

FIGS. 9–11 show different states along an initial magnetization curve, including states of negative residual flux density produced by a direct current, and an erased state produced by an alternating current;

FIGS. 12 and 13 show density distribution of P-particles, and the relationship between the density and hysteresis characteristics;

FIGS. 14–20 show the relationship between hysteresis characteristics and each state;

FIG. 21 shows the relationship between recording current and reproduced output with wavelength as a parameter;

FIGS. 22–27 are a series of illustrations of magnetic recordings, from waveforms of data signals to reproduced output and discrimination of the latter;

FIGS. 28–34 show the structure of an optical disk, its operation method, marks, signals and their treatment, and the principle of the treatment;

FIGS. 35–37 show recording marks in an optical disk, sensed output, and a double mark system;

FIGS. 38 and 39 show standard bar codes; and

Figure 40:
Figure 41:
Figure 42:
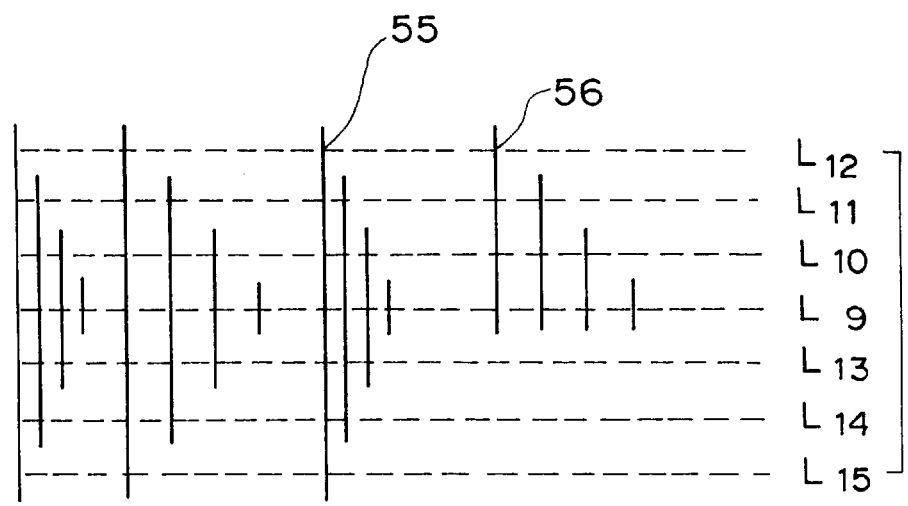

FIGS. 40–42 together show a preferred embodiment in accordance with the present invention for the discrimination of bar codes by thickness of a bar, breadth between bars, and length of a bar.

DESCRIPTION OF THE PREFERRED EMBODIMENTS

This is a description of preferred embodiments according to the present invention, with actual examples, referring to the drawings.

FIGS. 1–4 show examples of the structure of a magnetic film and a magnetic floppy disk suitable for multi-valued data elements. In these media, different kinds of magnetic points can be recorded according to the intensity of magnetism.

FIGS. 1 and 2 illustrate the structure of videotape as a plaster-type of flexible medium. FIG. 1 illustrates a plan view of the tape and FIG. 2 illustrates its vertical section.

As shown in FIG. 2, to a polyester base film 3, an undercoat 2 is applied. Then a magnetic layer 1 is formed by plastering a magnetic substance such as $\gamma$-$Fe_2O_3$, $CrO_2$ or Co-$\gamma$-$Fe_2O_3$ with a binder onto the undercoat. On the reverse side, a back coat 4 made of conductive carbon is applied for the purpose of protection.

FIG. 3 shows the structure of a magnetic floppy disk for computers as a thin-film type of hard medium. FIG. 3 is a plan view of the disk and FIG. 4 shows its vertical section.

As shown in FIG. 4, to a base disk 9 of AlMg alloy, a Ni—P undercoat 8 is applied by non-electrolytic plating. On the undercoat, plating or sputtering forms a magnetic layer 7 of Co—Ni—P or Co—Ni. On the surface of the layer, a film 6 of C or $SiO_2$ is applied for the purpose of protection and smoothing.

In order to record signals in a medium and reproduce them, a magnetic head is needed. FIG. 5 is a diagram of the structure of a magnetic head. For recording, a recording current 53 is run through a coil 54. A magnetic flux is thereby generated, which extends through a gap 56, permeates space and records a magnetic point on the medium 58.

In order to read, leakage flux of a magnetic point on the medium 58 is measured through the space of the gap 56 and the signal runs through the core 60. An electric current is thereby generated at the coil 54, producing reproduction voltage.

FIGS. 6–8 illustrate the characteristics of magnetic recording and reading.

FIG. 6 shows that magnetic recording basically has the same non-linear characteristic as the amplification characteristic of a semiconductor.

Reference numeral 61 in FIG. 6, indicates a hysteresis characteristic (a magnetization curve or a J-H curve). Reference numeral 62 indicates a magnetic field waveform of an input signal: Solid line 15 represents an input magnetic field waveform generated by a direct current, and dotted line 16 represents an input signal magnetic field waveform generated by an alternating current. In this example, the heights of the waveform generated by a direct current correspond to, and are reflected by, a recording magnetization characteristic 11, which is the initial hysteresis magnetization curve 10. Reference numeral 63 indicates leakage flux waveforms: solid line 13 represents a leakage flux waveform resulting from a direct current, and dotted line 14 represents a leakage flux waveform resulting from an alternating current.

The heights of the magnetic field waveform 62 of the input signal corresponds to the heights of the leakage flux waveform 63. Thus when a recording current with various heights according to input signals goes through the coil, various intensities of magnetization are generated in the medium. Similarly, the intensity of a leakage flux in the medium yields various heights in the reproduction voltage. This principle provides a characteristic feature for the present invention.

FIGS. 7 and 8 show the relationship between the magnetization of the medium and the reproduction output. A waveform of leakage flux 17 in FIG. 7 magnetized in the medium produces reproduction voltage in comparison with time differential value, and results in a waveform 18 in FIG. 8. A shaping circuit can be used to trim this distorted waveform.

FIG. 9 illustrates various magnetic domain states a–d in the four circled areas at selected points along the initial magnetization curve 19. The states are expressed in terms of the magnetic walls and of magnetization directions (spins), along with the movement of the transition axis 22 of magnetization.

In FIG. 9, the magnetic domain initially corresponds to an erased state a, with its transition axis in the center. This is the case when an external magnetic field H is not put on a ferromagnetic bulk material. When a weak external magnetic field is put on this erased state a, the transition axis moves, and the domain turns into the state b. A stronger external field turns the domain into the state c, which looks fully magnetized as a whole. And a much stronger external field brings the domain to the state d, with all the magnetization directions (spins) 20 in magnetic walls 21 in the same direction as that of the external field.

FIG. 10 illustrates the state of a domain in which magnetization inversion lines 24 are expanded from the inverse saturated magnetic field toward the P-particle distribution range 23. FIG. 11 illustrates the erased state produced by an alternating current. On both sides of a zigzag magnetization inversion line 25, the numbers of positive and negative magnetization particles are distributed approximately equally, resulting in the erased state. The higher the frequency of the alternating current, the finer the zigzag becomes.

FIG. 12 illustrates the density distribution of P-particles, $\rho(a, b)DaDb$, in microsquares Da and Db around a point P(a, b). FIG. 13 shows the relationship between $\rho(a, b)DaDb$, i.e., the density distribution in FIG. 12, and the hysteresis characteristic. The relationship can be expressed by the following formula:

$$\rho(a, b)DaDb = J(H_1H_3) - J(H_1H_4) - J(H_2H_3) + J(H_2H_4)$$

Figure 14:
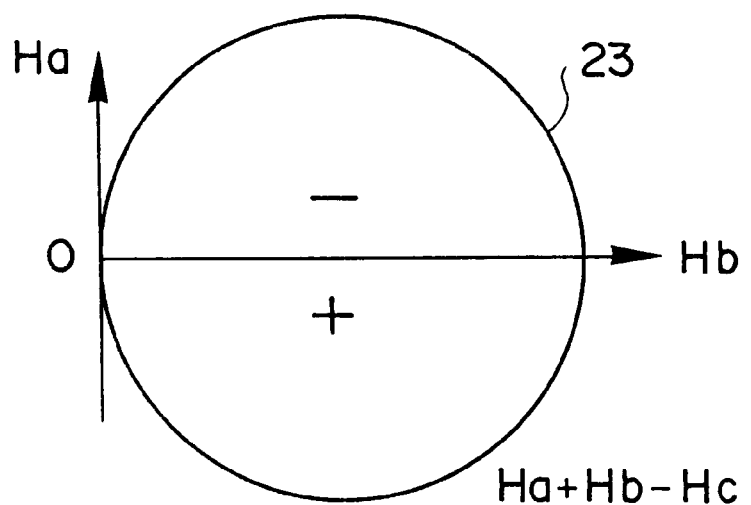
Figure 20:
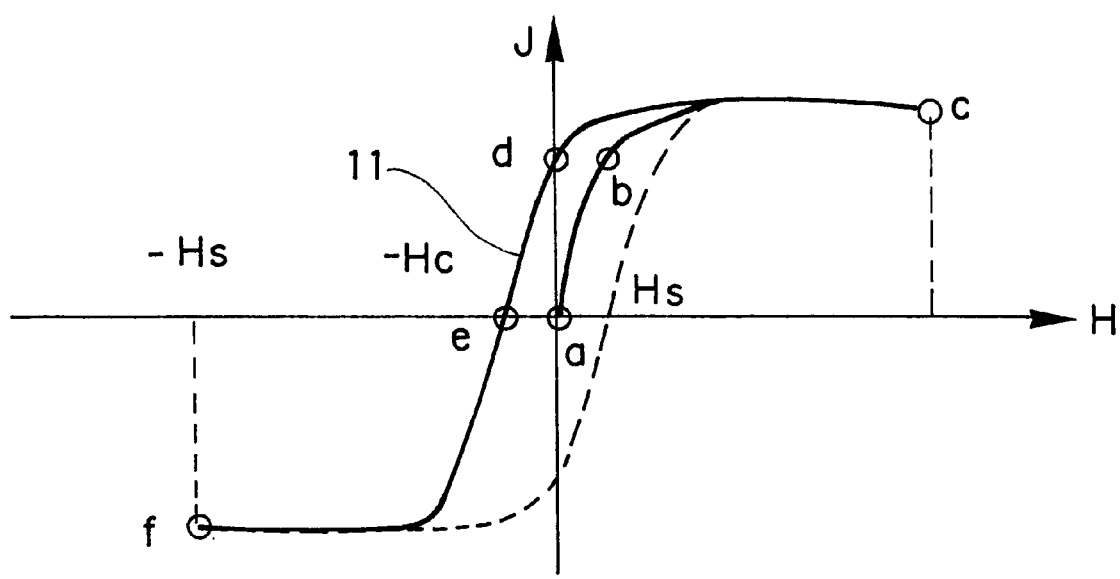

FIGS. 14-20 explain the relationship between the hysteresis characteristic and the magnetic domain states as follows:

FIG. 14 shows the erased state, which corresponds to the point a in FIG. 20, as the initial condition of the hysteresis characteristic.

Figure 15:
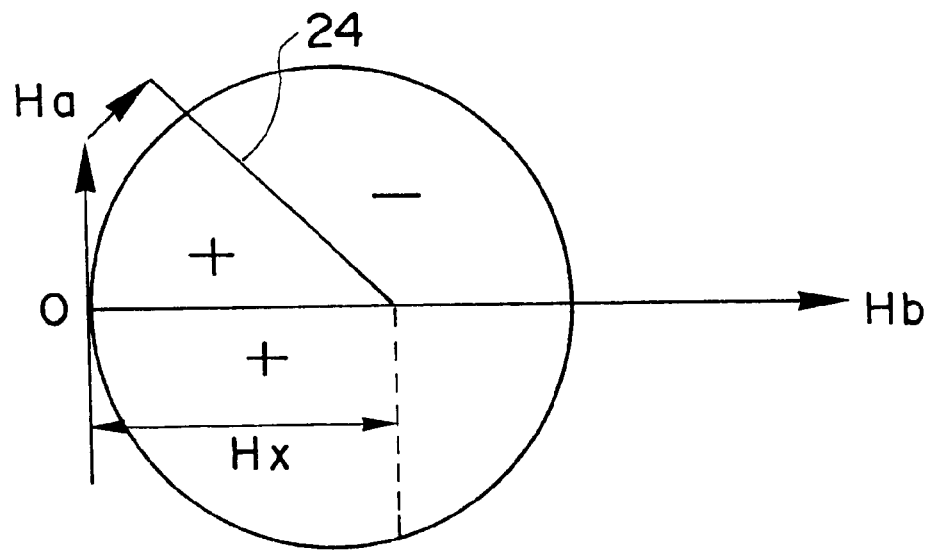

FIG. 15 shows the state corresponding to the point b in FIG. 20, where an external magnetic field Hx is put on the medium in the positive direction.

Figure 16:
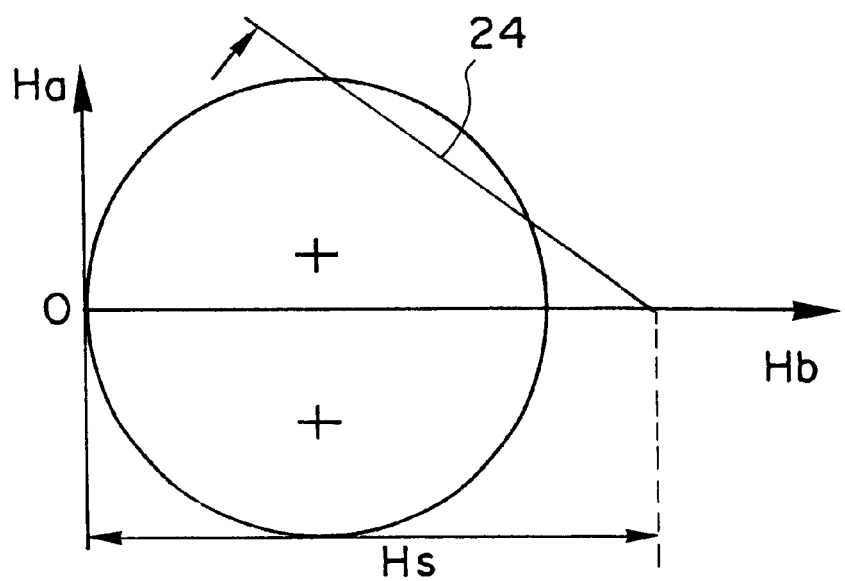

FIG. 16 corresponds to the point c in FIG. 20, where a much stronger external magnetism Hs has shifted the magnetization inversion line to the right, bringing the domain to the state of positive saturation.

Figure 17:
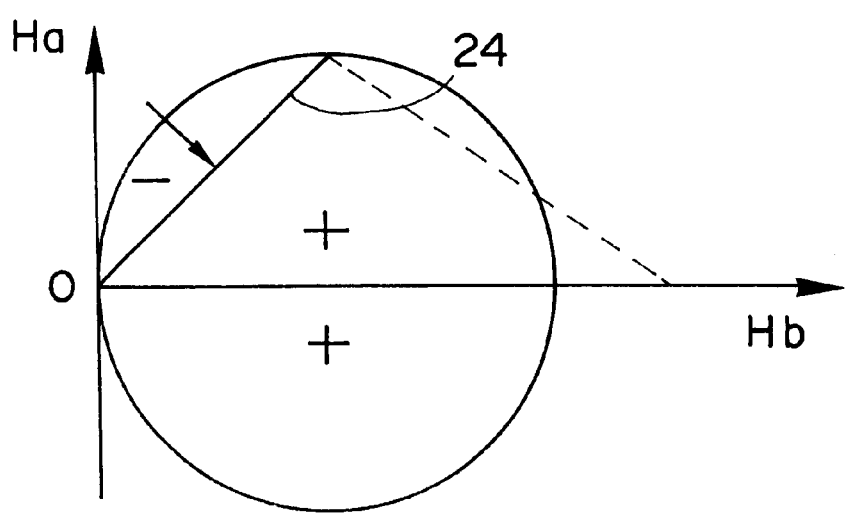

FIG. 17 shows the state of positive residual magnetization, which corresponds to the point d in FIG. 20. As the external magnetism decreases in intensity to zero, the point c in FIG. 20 shifts to d.

Figure 18:
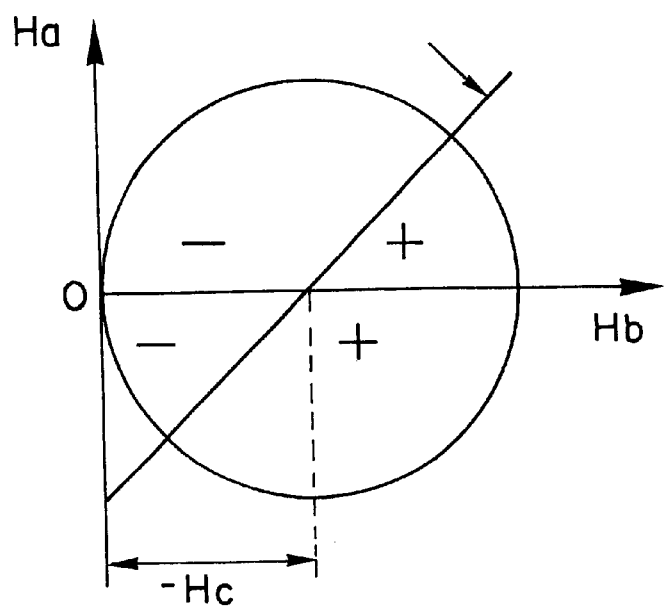

FIG. 18 corresponds to the point e in FIG. 20. An external magnetic field Hc has worked in the negative direction until the point d in FIG. 20 shifts to e, where coercive force is generated.

Figure 19:
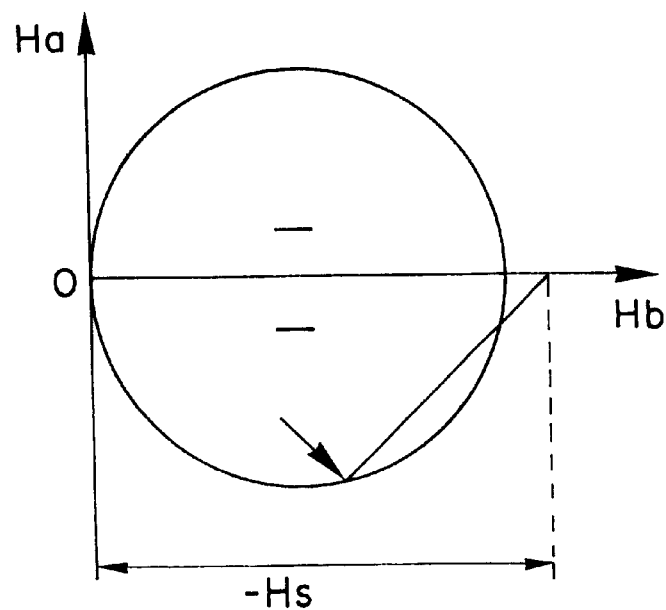

In FIG. 19, the state shown corresponds to the point f in FIG. 20, which is that of negative saturation brought about by a much stronger negative magnetism Hs.

FIG. 21 shows that when recording current i and its wavelength λ, vary according to input signals, reproduced output also changes. This fact is important.

From all the foregoing, it is obviously possible to vary the intensity of recording magnetic fields. And from FIG. 21, it is also clear that the recording magnetic field varies its intensity in accordance with recording current and its wavelength, and so does the reproduced output generated by the leakage flux of the magnetic field.

The magnetization of one particle in a single domain in a medium is achieved only by the rotation of the magnetization direction. In such a case, much energy is needed to change the direction against crystal magnetic anisotropy. This fact provides a strong coercing force for the domain.

Figure 22:
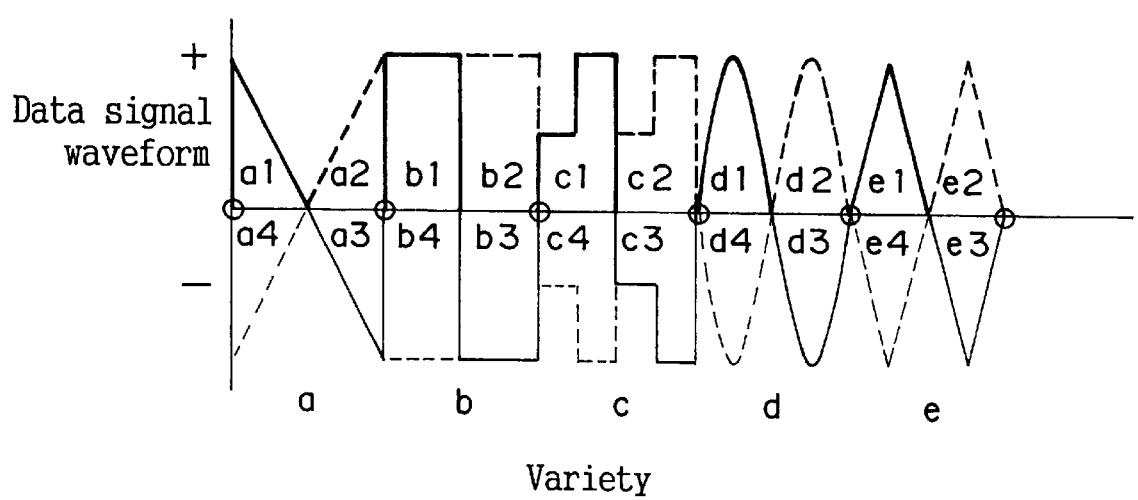
Figure 23:
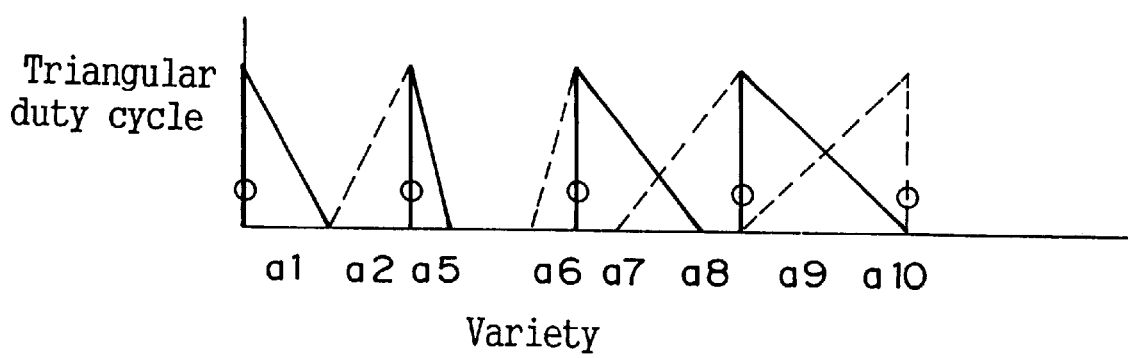
Figure 24:
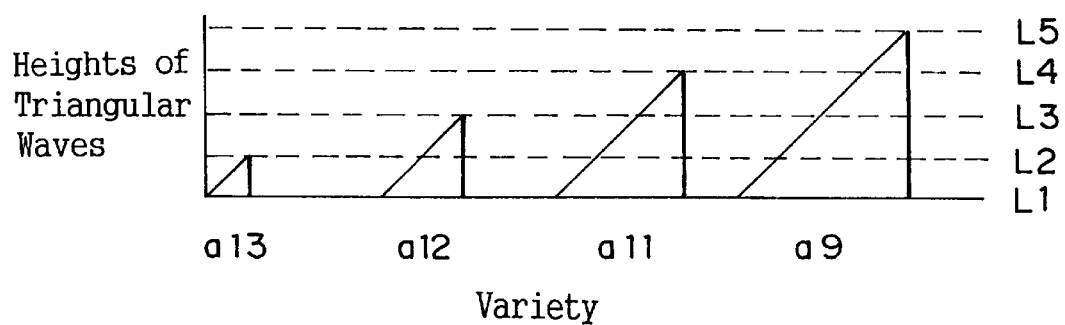
Figure 25:
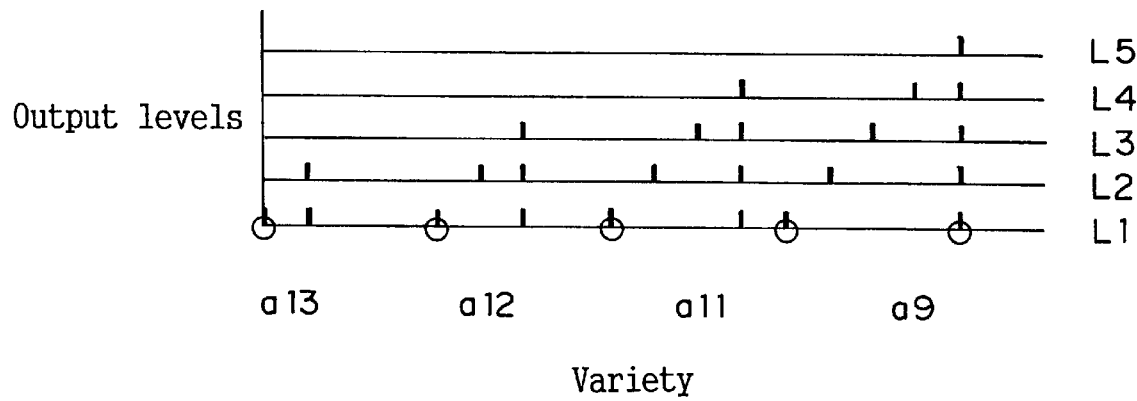
Figure 26:
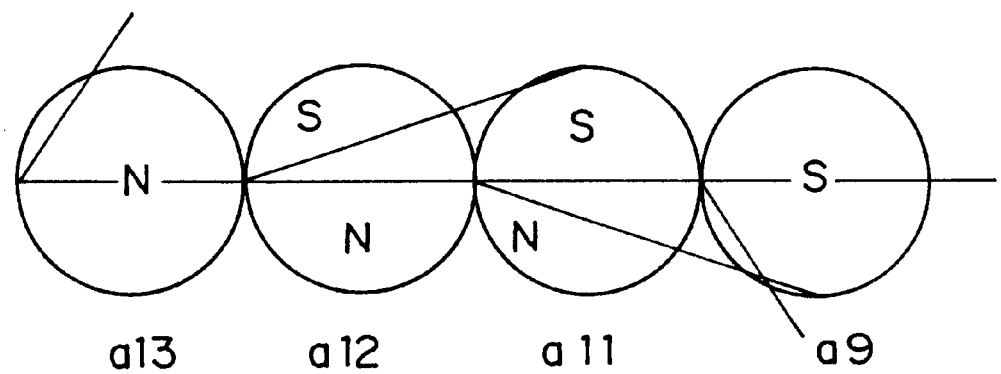
Figure 27:
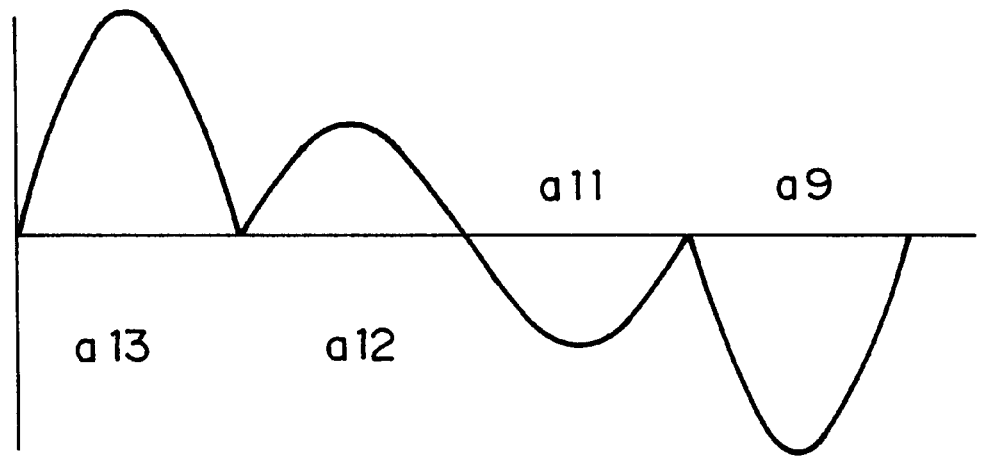

FIGS. 22 and 23 shows a variety of data signal waveforms for recording by a recording current, and their reproduced counterparts discriminated from one another.

FIG. 22 illustrates examples of data signals to be recorded. These signals are input into the magnetic head, with a signal of the highest level at their beginning, in order to adjust the signals for level sensing.

FIG. 23 shows the reproduced counterparts of the data signals in FIG. 22. After an AGC or limiter is adjusted to the highest level, sensing levels discriminate the waveforms of the output signals correctly.

FIGS. 28-32 illustrate the recording system with an optical disk for multi-valued data elements in which shape, length, and etc., of optical marks are used as signals, and in which the marks can be written, read, erased, and corrected.

Figure 28:
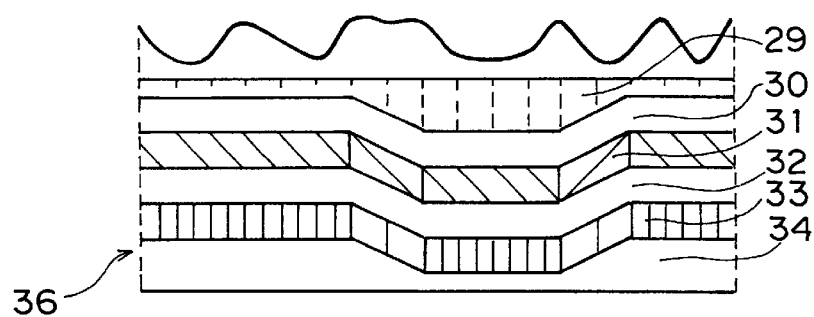

FIG. 28 illustrates a section taken vertically through a two-sided optical disk 36 used for an experiment with this invention. As illustrated, the disk includes a base plate 34 of polycarbonate, a dielectric layer 33 of ZnS—$SiO_2$, a recording layer 32 of GeTe—$Sb_2Te_3$—Sb, another dielectric layer 31 of ZnS—$SiO_2$, a reflecting layer 30 of Al, and an adhesive layer 29 to bind the two sides.

Figure 29:
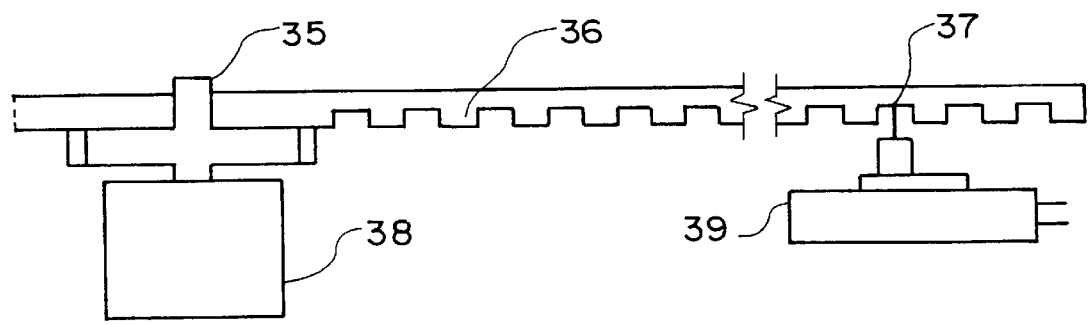

FIG. 29 shows means to drive the optical disk 36 for multi-valued data recording. To drive the disk 36, it is placed onto the shaft of a motor 38 which at the same time serves as the disk drive shaft 35. To write-in and read-out signals, a laser 37 is emitted by an optical head 39. During read-out, the head 39 detects the change of reflection rate of the emitted laser reflected by the medium.

FIG. 30 illustrates recording conditions in the optical disk 36 for multi-valued data elements.

Some examples of recording marks are shown in rows a and b of the disk 36 in FIG. 30. Row c shows that an old mark 42 has been erased and a new mark 41 written in the row.

The optical disk 36 was 2.5 mm thick, and 120 mm in diameter. Wavelength of the laser was about 800 nm, rotary velocity of the motor 1800 rpm, and driving velocity 30 rpm. Recording power was about 20 mW, linear velocity 10 m/s, and length of a mark 1 μm. The grooves d and e were 100 nm deep, 1.6 μm wide, and 0.8 μm apart from each other.

FIG. 31 shows the relationship between laser power and patterns produced by the head 39. When laser power 64 for reproduction, erasure, and recording is applied to the disk as in FIG. 31, patterns are produced and recorded as in the marking 66 in the figure. In order to correct these patterns, laser power 68 for correction is applied as in FIG. 31. Then the patterns are corrected as in marking 70 of FIG. 31.

Figure 32:
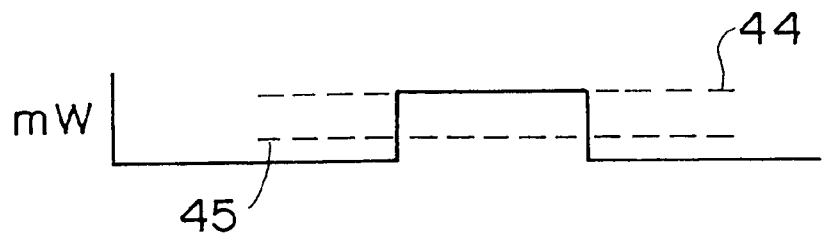

FIG. 32 expresses conditions for use of GeTe—$Sb_2Te_3$—Sb in the recording layer of the disk when amorphized or crystallized by the power of a laser pulse: the recording layer is amorphized by a laser pulse of 80 ns in duration and 20 mW in power, and it is crystallized by a laser pulse with the same duration and 10 mW in power.

Figure 33:
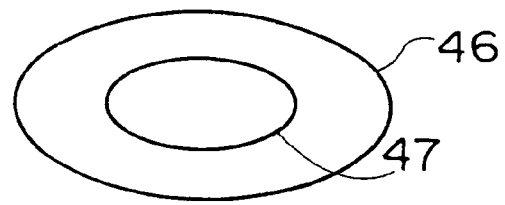
Figure 34:
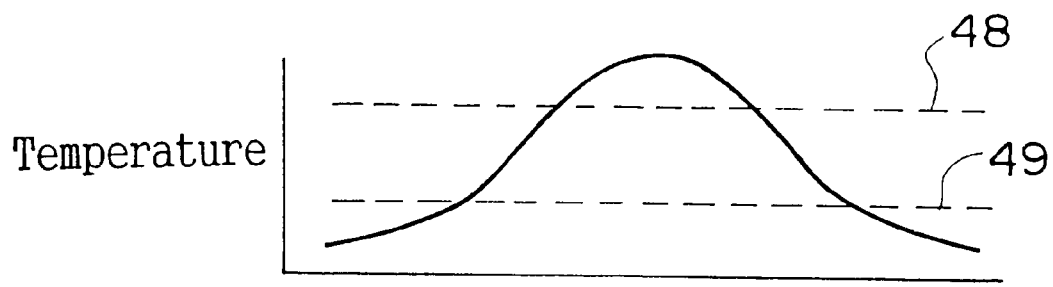

FIG. 32 shows power levels for the laser power: reference numeral 44 indicates the level for recording power, while reference numeral 45 indicates the level for erasing power. FIG. 33 shows a plan view of pattern states (an erased ring 46 and a recorded ring 47). As shown in FIG. 34, an impressed temperature equaling the crystallization point 49 makes a larger pattern, while an impressed temperature equaling the melting point 48 makes a smaller pattern.

FIG. 35 illustrates examples of recording marks reproduced as signal pulses in FIG. 36. A circuit integrates the length of each optical mark to create the pulses 50 (FIG. 37), and a level sensor senses and discriminates the reproduced pulses 50.

FIGS. 38 and 39 show examples of standard bar codes: FIG. 38 illustrates high density bar code, while FIG. 39 illustrates low density bar code. With four kinds of thickness of bars and various breadths between them, the bar codes express a number of parameters. These bar codes are shown here for comparison with a recording method in accordance with the present invention.

FIGS. 40–42 together illustrate examples of preferred embodiments of recording methods in accordance with the present invention.

FIG. 40 is an example of bars of different thicknesses, and FIG. 41 is an example of different breadths between bars. These parameters are the same as conventional bar codes. The quantity of data that can be expressed by these elements is now becoming limiting.

So, in FIG. 40, a preferred embodiment in accordance with the present invention uses length of bars as codes, sensed by level sensor to encode additional data values. Reference numeral 56 indicates positive codes and reference numeral 55 indicates positive-negative codes. Combining these parameters with standard bar code techniques greatly increases the quantity of information that can be encoded with bar codes.

As mentioned above, the present invention provides for recording of very large quantities of data, with easy systems operation, and a reduction of bit cost to less than half. The experiment mentioned previously shows that a medium recorded in accordance with this invention enables long storage of data, and has good weather resistance. Therefore, information recorded on the medium can be read-out accurately, and the medium can be used repeatedly without being damaged. This invention makes it possible to record much information in high density, and to write-in and read-out at high speed.

What is claimed is:

1. A method of increasing digital data storage capacity for recording media, wherein the recording media includes a plurality of recording locations, the method comprising the steps of:
   (a) defining a number of selectively variable magnetization intensity levels for each data recording location on the recording media, the defined selectively variable magnetization intensity levels corresponding to at least an erased state, a partially magnetized state, a fully magnetized state and a state including magnetization spins all aligned the same;
   (b) selecting a notation system comprising digits that include a number of different possible values for each digit, with the total number of possible values for each digit corresponding to the number of selectively variable magnetization intensity levels defined for each data recording location;
   (c) uniquely associating each possible value of the digits to a different selectively magnetization intensity level defined for each recording location; and
   (d) recording the data on the recording media in a format in accordance with the notation system, by adjusting the magnetization intensity level of data recording locations where a digit of the data is recorded on the recording media.

2. The method of claim 1, wherein magnetization intensity of a recording location where a digit of data is recorded, corresponds in level to the value of the digit.

3. A method of increasing digital data storage capacity for recording media, wherein the recording media is substantially planar and includes a plurality of recording locations, the method comprising the steps of:
   (a) defining at least three optical patterns for each data recording location on the recording media for selective formation at the data recording locations, the optical patterns being distinguishable from one another based on at least one of size and shape extending substantially along the plane of the recording media;
   (b) selecting a notation system comprising digits that include a number of different values for each digit, with the total number of possible values for each digit corresponding to the number of optical patterns defined for each data recording location;
   (c) uniquely associating each possible value of the digits to a different pattern defined for each recording location; and
   (d) recording the data on the recording media in a format in accordance with the notation system, by forming optical patterns at recording locations where a digit of the data is recorded on the recording media.

4. The method of claim 3, wherein the recording media comprises a material crystallizable, and the step of recording data on the recording media includes subjecting the recording media at recording locations for recording data, to a laser beam and selectively crystallizing the recording media at recording locations.

5. The method of claim 4, wherein the material comprises GeTe—$Sb_2Te_3$—Sb.

6. The method of claim 5, further comprising the step of modifying data recorded on the recording media, by altering the optical patterns of recording locations where data has previously been recorded during the step of recording the data on the recording media.

7. The method of claim 4, further comprising the step of modifying data recorded on the recording media, by altering the optical patterns of recording locations where data has previously been recorded during the step of recording the data on the recording media.

8. The method of claim 7, wherein the recording media comprises a material amorphizable and crystallizable, and the step of recording data on the recording media includes subjecting the recording media at recording locations for recording data, to a laser beam at a first power level and crystallizing the recording media at recording locations; and
   the step of modifying data includes subjecting the recording media at recording locations to a laser beam at a second power level and amorphizing the recording media thereat when data is modified at that recording location.

9. The method of claim 8, wherein the material comprises GeTe—$Sb_2Te_3$—Sb.

10. The method of claim 3, further comprising the step of modifying data recorded on the recording media, by altering the optical patterns of recording locations where data has previously been recorded during the step of recording the data on the recording media.

11. A method of increasing digital data storage capacity for recording media, wherein data is recorded on the media as bar card elements, the method comprising the steps of:
    (a) defining at least three attributes for each bar code element;
    (b) selecting a notation system comprising digits that include at least three different possible values for each digit for recordation of data on the recording media;
    (c) uniquely associating each possible value of the digits to a different attribute defined for each bar code element; and
    (d) recording the data on the recording media in a format in accordance with the notation system, by adjusting the defined attributes of the bar code elements where a digit of the data is recorded on the recording media.

12. The method of claim 11, wherein the at least three attributes correspond to length and thickness of bar code elements, and spacing between bar code elements.

13. An electronically readable computer product comprising:
    (a) a recording media including a material amorphizable at one temperature and crystallizable at another temperature, the media further including a plurality of recording locations, and each recording location comprising one of at least three optically distinguishable patterns; and
    (b) signal trains recorded on the recording media, with the signal trains expressing data according to a notation system comprising digits including at least three possible values per digit and each value uniquely associated with one of the at least three optically distinguishable patterns, and recording locations where digits of the signals trains are recorded thereat corresponding to the value of the digit recorded at that recording location, with the material at recording locations where a nullity is recorded being substantially amorphized, and recording locations where a digit other than a nullity is recorded, crystallized.

14. The electronically readable computer product of claim 13, wherein the material comprises GeTe—$Sb_2Te_3$—Sb.

15. The electronically readable computer product of claim 13, wherein the recording media is substantially planar and each pattern represents the value of a digit recorded at the recording location corresponding to the optical pattern, based on at least one of shape and length, extending substantially along the plane of the media, of the optical pattern.

16. A system for storing data in electronically readable format, the system comprising:
   (a) substantially planar recording media including a plurality of data recording locations, wherein each data recording location is defined with one of at least three optical patterns, the optical patterns being distinguishable from one another based on at least one of size and shape extending substantially along the plane of the recording media; and
   (b) a recorder operable for expressing data in signal trains according to a notation system comprising digits that include at least three possible values per digit for recordation of data on the recording media by uniquely associating each possible value of the digits with a different optical pattern at the recording locations than the other values of the digits, and recording the signal trains on the recording media by creating optical patterns at recording locations where digits of the signal trains are recorded on the recording media according to the value of the digit recorded at that location.

17. The system of claim 16, wherein the material comprises GeTe—$Sb_2Te_3$—Sb.

18. The system of claim 16, wherein the recording media comprises a material amorphizable and crystallizable, and the recorder includes a laser which selectively subjects the recording media at recording locations for recording data, to a laser beam at a first power level and crystallizing the recording media thereat when data is recorded at that recording location, and subjects the recording media at recording locations to a laser beam at a second power level and amorphizing the recording media thereat when erasing data at that recording location.

19. The system of claim 18, wherein the material comprises GeTe—$Sb_2Te_3$—Sb.

20. The system of claim 16, further comprising means for erasing optical patterns previously created at recording locations with the recorder.

* * * * *